United States Patent [19]
Townsend

[11] Patent Number: 6,010,182
[45] Date of Patent: Jan. 4, 2000

[54] VEHICLE CHASSIS AND BODY CONSTRUCTION

[75] Inventor: John A. Townsend, Bloomfield Hills, Mich.

[73] Assignee: Joalto Design, Inc., Southfield, Mich.

[21] Appl. No.: 09/058,514

[22] Filed: Apr. 10, 1998

Related U.S. Application Data

[60] Provisional application No. 60/043,466, Apr. 11, 1997.

[51] Int. Cl.[7] .................................................. B62D 27/00
[52] U.S. Cl. ..................... 296/203.01; 296/29; 296/191
[58] Field of Search ............................... 296/203.01, 29, 296/191, 205; 403/169, 217, 170, 321, 322

[56] References Cited

U.S. PATENT DOCUMENTS

| | | | |
|---|---|---|---|
| 4,129,975 | 12/1978 | Gabriel | 52/648 |
| 4,533,172 | 8/1985 | Oliver | 296/185 |
| 4,573,733 | 3/1986 | Zaydel | 296/191 |
| 5,421,666 | 6/1995 | Spears | 403/176 |
| 5,531,464 | 7/1996 | Maurer | 280/47.35 |
| 5,699,698 | 12/1997 | Geyer | 74/526 |

*Primary Examiner*—Joseph D. Pape
*Attorney, Agent, or Firm*—Rader, Fishman & Grauer PLLC

[57] ABSTRACT

This invention relates to chassis and body panel structural systems for a wide variety of vehicles, including automotive, water vessels, aircraft and human powered vehicles, principally comprising a node and interlocking spaceframe system that can be hand assembled in the field. The invention also comprises a key and lock system for wedgingly interlocking body panels to the spaceframe. Together these systems comprise novel Frame Integration Technology (FIT) of the invention. Examples of vehicles include autos, utility vehicles (trucks), public transport vehicles, light boats, human powered vehicles such as bicycles, pedicabs and the like, and light aircraft.

14 Claims, 4 Drawing Sheets

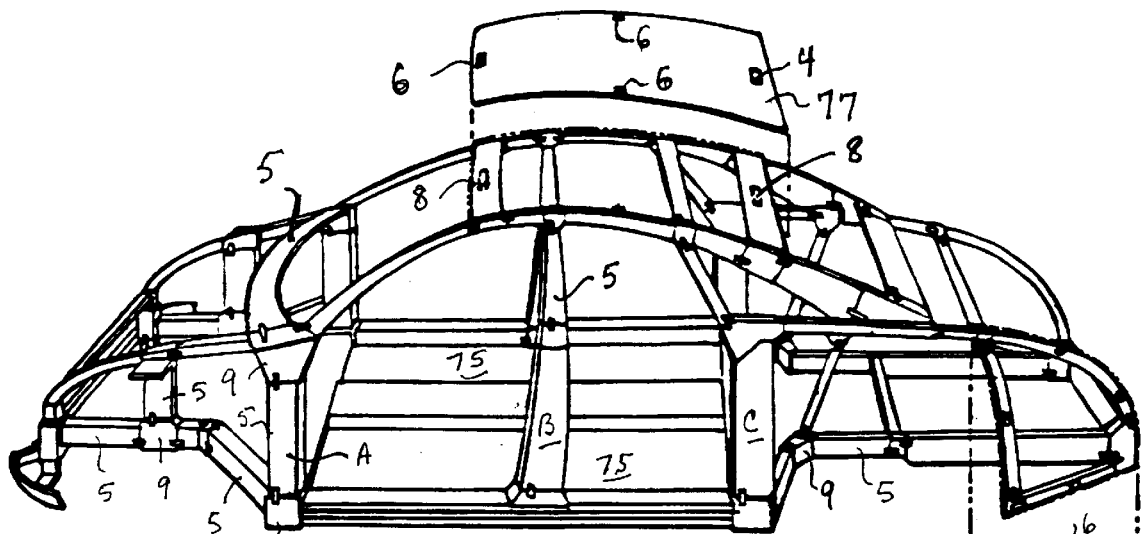
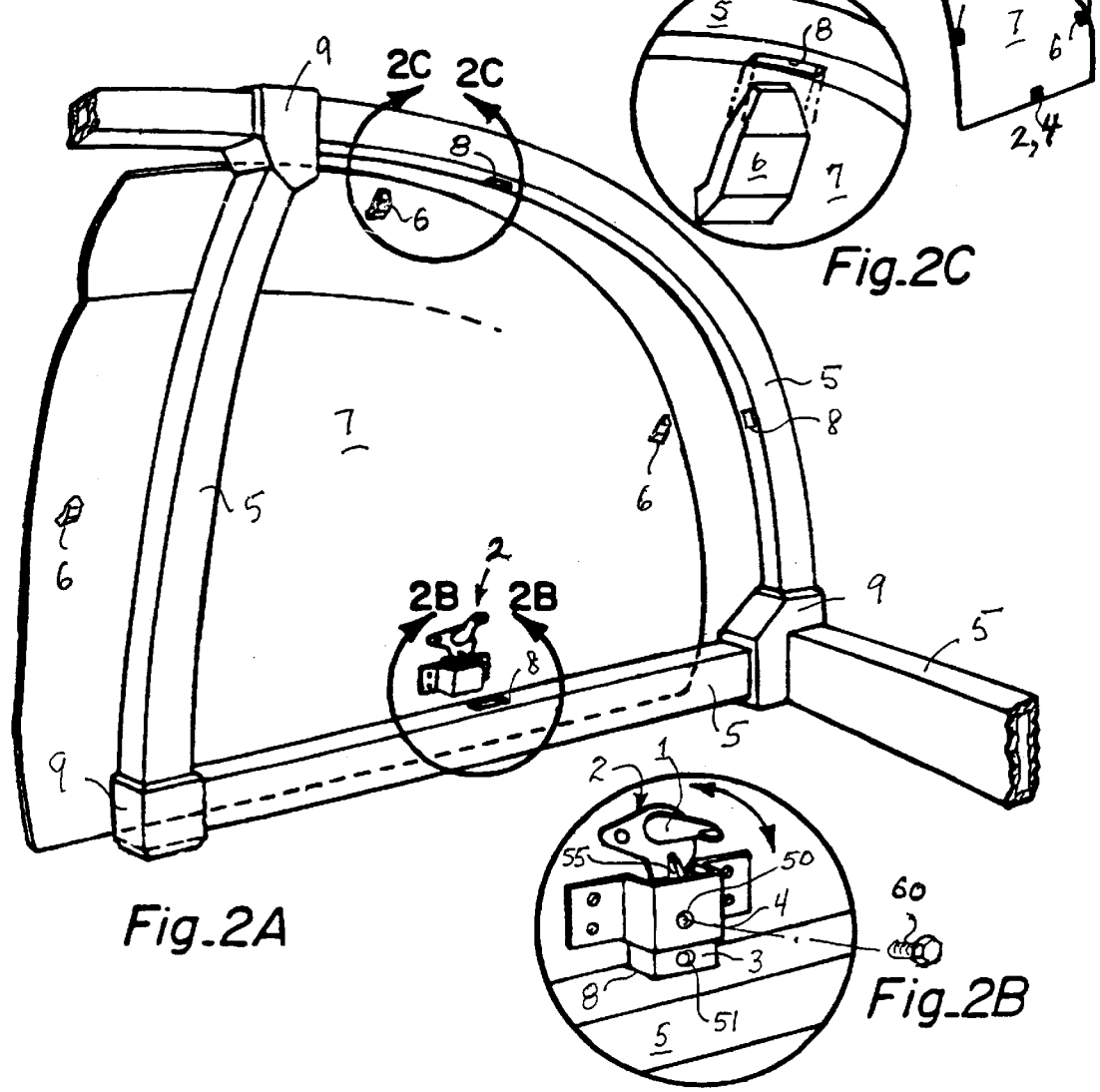

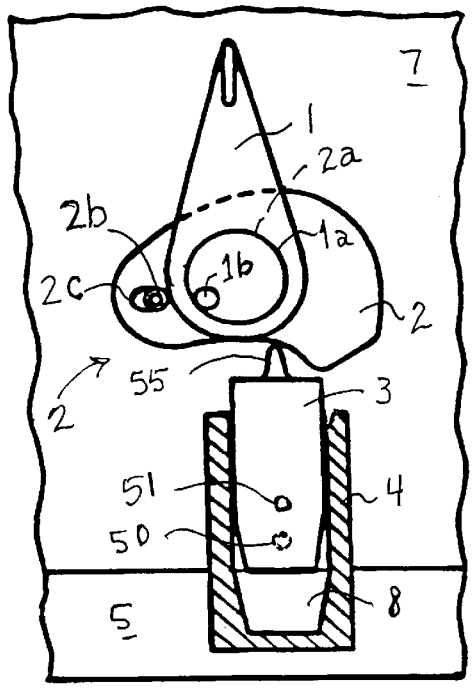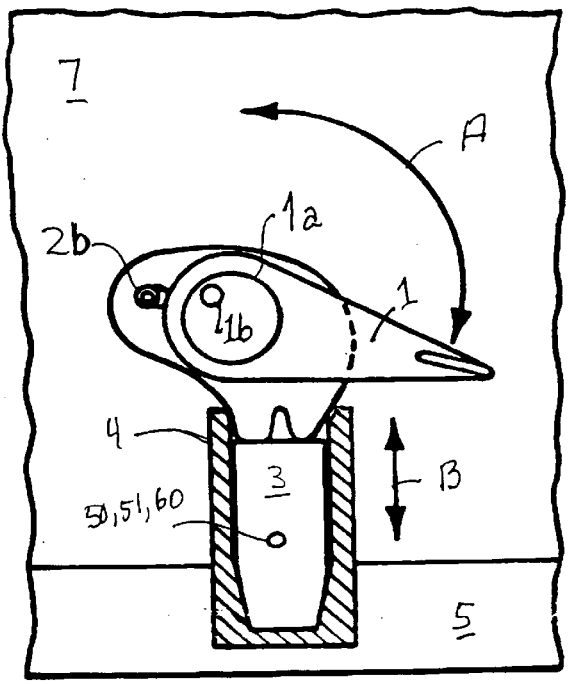
Fig.3A  Fig.3B
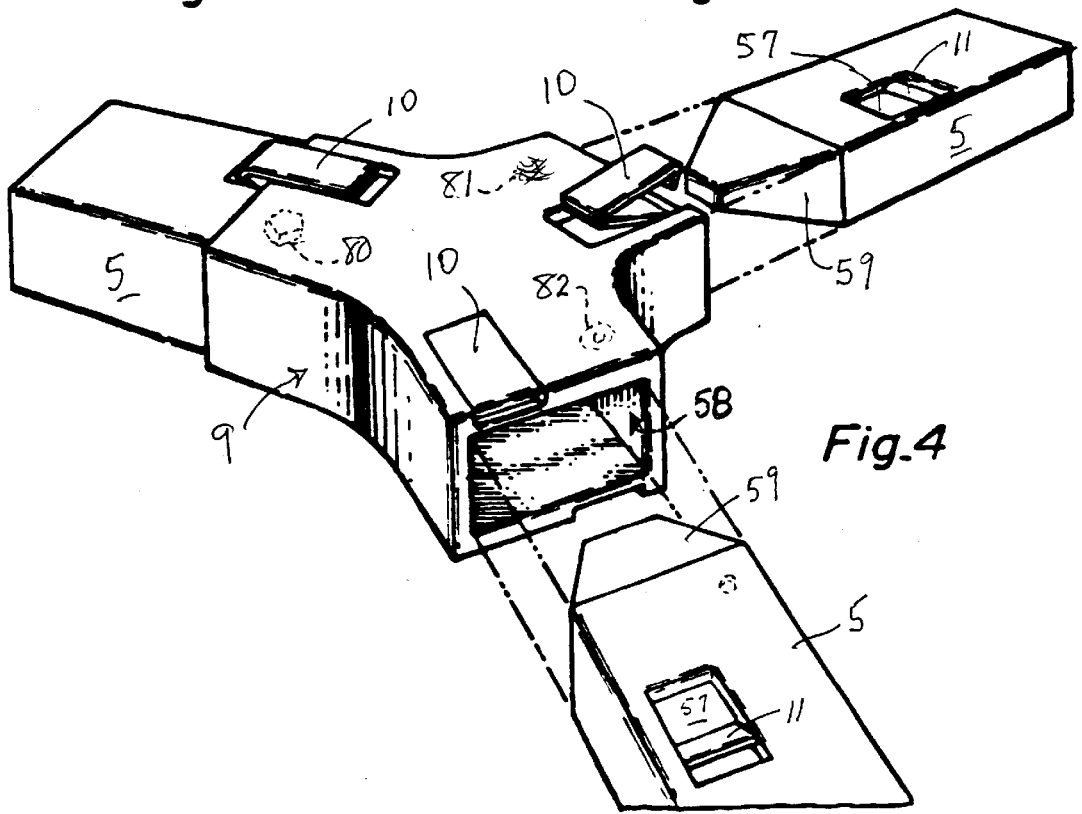
Fig.4

VEHICLE CHASSIS AND BODY CONSTRUCTION

This application claims benefit of provisional application 60/043,466, filed Mar. 11, 1997.

FIELD OF THE INVENTION

This invention relates to chassis and body panel structural systems for a wide variety of vehicles, including automotive, water vessels, aircraft and human powered vehicles, principally comprising a node and interlocking spaceframe system that can be hand assembled in the field. The invention also comprises a key and lock system for wedgingly interlocking body panels to the spaceframe. Together these systems comprise novel Frame Integration Technology (FIT) of the invention. Examples of vehicles include autos, utility vehicles (trucks), public transport vehicles, light boats, human powered vehicles such as bicycles, pedicabs and the like, and light aircraft.

BACKGROUND OF THE INVENTION

Heretofore, applicant has developed technology in which vehicle doors are integrated with the vehicle chassis to transmit tensile, compressive, torsional and bending forces across the door opening when the door is closed. This door and chassis integration technology (hereinafter referred to as DACIT) allows the vehicle chassis to be lighter and stiffer, and affords greater protection to vehicle occupants from intrusion during a collision. DACIT has been applied by the applicant to vertically sliding doors, conventional hinged doors, van side and rear doors, and other moving door panels such as hatchbacks, tailgates, hoods, and trunks. This technology is fully described in U.S. Pat. Nos. 4,801,172, 4,940,282, 5,378,036, and U.S. application Ser. Nos. 08/328, 124, 08/439,605, 08/577,649, 08/769,895, incorporated herein by reference.

In the preferred embodiments of the above inventions, frusto-pyramidically-shaped structural key members are rigidly mounted on the corners of the door panel facing toward the interior of the vehicle. Complementary-shaped mating receptacles are rigidly mounted to the door jamb facing outward such that they releasably receive the structural key members when the door is closed. With a structural framework located within the door interconnecting the key members, the door is able to act as part of the vehicle chassis and transmit forces across the door opening when the door is closed and the keys are tightly fit within the mating receptacles.

The present invention furthers the above technology by applying similar, releasable structural connections to vehicle chassis members such that the chassis can be made up of individual members releasably joined together. The above technology is also adapted to releasably attach non-movable vehicle body panels to the chassis. This results in a fully modular car having a body and chassis that are both load bearing for greater structural efficiency and reduction in vehicle weight.

SUMMARY OF THE INVENTION

Broadly stated, the preferred embodiment of a vehicle constructed according to the present invention comprises three main aspects: a three-dimensional space frame made up of standardized, detachable members; a body made up entirely of separate, removable panels that interlock with the space frame; and movable panel members such as doors, hood and trunk, each having frame members that structurally interlock with the space frame to become part of the vehicle chassis structure when closed.

With the inventive interlocking system, all body panels are locked into place by a semi-permanent latching system. A panel can easily be replaced with a similar panel in the event of damage. The panels can also be re-arranged in such a way as to alter the makeup of the vehicle. You can, for example, convert a sports utility vehicle (SUV) into a truck by merely substituting the panels for the SUV with a series of alternately-designed panels pertaining to a truck.

The panels interlock with a purpose-designed vehicle spaceframe (chassisframe) via keys, receptacles and a semi-permanent latching system. The spaceframe itself can be altered in the same way so that it can be locked together in a similar fashion. Substitutions of alternative frame sections can also be made on the spaceframe. For example, a short wheel-based two-door vehicle can be transformed into a long wheelbased four-door vehicle by locking new spaceframe segments and panels into place. The possibilities for transforming one vehicle type into another are far reaching under this inventive system, provided the spaceframe is designed from the onset with each alternative vehicle type in mind.

This interlocking system has a wealth of benefits in terms of simplicity, versatility, and inexpensive assembly. It also has the ability to use a wide range of construction materials as required (i.e. steel, aluminum, plastic, carbon fiber, glass fiber, etc.). What makes this novel approach even more pertinent is that very basic, inexpensive vehicles can be produced for third world countries and areas where automobiles are not now accessible to the general population. Yet with the rising costs of new, standard vehicles, the inventive vehicles described herein can also become popular in developed nations as well, albeit in a more luxuriously appointed form. This concept would not affect the mechanical portions of the vehicles (engine, gearbox, suspension, etc.).

The essence of this invention is that we have developed a "transportation system" rather than a single-entity vehicle. This is achieved by creating a unibody incorporating three locking mechanisms: a new concept in which the spaceframe members lock together; another novel approach in which the panels lock to the spaceframe; and the use of applicant's existing, patented door and chassis integration technology, a structural locking and de-latching system in which frame members of the door lock to the main frame. This "transportation system" vehicle can be transformed or altered with a variety of additions and subtractions to the panels or spaceframe throughout its life. It's a systematic method of creating a vehicle which, in any form, will be lighter yet stronger and safer than any present-day vehicle of comparative size and performance.

Since the unibody/chassisframe no longer incorporates any outer panels in its basic structure, it can become a true spaceframe consisting of extruded or molded materials (such as steel, aluminum, carbon fiber or plastic) with cast or fabricated nodes at the locations where these elements join together. By using suitable materials in any combination throughout the vehicle, a lighter, stronger overall structure can be produced.

When the spaceframe members are locked together in a similar manner to the body panels, the production of such vehicles is greatly simplified compared to conventional construction practices today. The advantages of this vehicle build method include simple tooling (which removes the need for large dies and stampings), efficient assembly, less skilled labor and the virtual elimination of welding. The most significant difference in the manufacturing of such vehicles is that a pre-assembly line is set up to lock together the component pieces for the spaceframe, which have been previously extruded, cast or molded, as opposed to welding large stampings together before the vehicle goes onto a traditional assembly line. This pre-assembly of the spaceframe can also be performed by robots.

The panels lock into the spaceframe rather than into one another. This semi-permanent locking occurs through molded-in structural keys and receptacles and a simple but strong locking device which causes the panels to become full load-bearing members within the overall structure. With the addition of DACIT for the door, trunk and hood openings, it is envisioned that the resulting unibody/spaceframe will be the stiffest, strongest, lightest structure possible. Another advantage of this form of construction is that the unibody/spaceframe will be easily transformable into alternate vehicles. Additionally, design changes can be implemented in a simple, inexpensive fashion and repair of damaged areas of the structure will be easy and cost-effective.

Panels can also be locked in a semi-permanent fashion to a more traditional single, welded spaceframe. In this instance, the panels can still be easily replaceable but the vehicle can not easily be transformed into another vehicle.

As outlined below, the advantages of this inventive vehicle construction system are far-reaching in terms of safety, damage correction, durability, design, structure, manufacturing, use of materials and recyclability.

Safety—An interlocking vehicle constructed according to the present invention can be made safer than the luxury cars on the road today. All of the enormous safety benefits of DACIT are fully realized since the entire vehicle is locked together through the use of the keys, receptacles and the semi-permanent latching system. The front and rear "crush zones" can be designed into the frame by means of springs and progressively deformable materials (i.e. materials having progressively increasing strengths.) DACIT-style side intrusion beams or other structural protection can be designed into the doors of the vehicle and can also be structurally integrated with the door jambs through the keys and receptacles. Most recent demonstration vehicles which offer extensive safety features carry a substantial weight penalty. In contrast, the inventive interlocking vehicle can be made significantly lighter than any comparable production vehicle today while offering much improved passenger safety. Handling will also be greatly improved, such as by increased vehicle stiffness, which itself is a safety feature since drivers have a greater chance to avoid a potential accident or at least lessen the damage of an accident by remaining in control of a highly maneuverable machine.

Damage Correction—On current vehicles, almost any repair is costly because substitute parts are sometimes difficult to find and paint matching is required. With the present invention, repairing damaged parts is much simpler and less time-consuming. A damaged panel is easily replaced by a similar panel, which can quickly be locked into place without any repainting if the vehicle uses textured or self-colored materials. Replacement frame tubes can also be easily inserted, if required, in the event of vehicle damage.

Durability—While the inventive vehicle can be designed in a basic, low-cost fashion, its life span will not have to be compromised, as the inventive vehicle will last as long, if not longer, than most present-day vehicles. Preferably, only rustproof materials are used and panel replacement merely requires unlatching a panel through the semipermanent latching system, substituting a similarly-constructed one into its place and locking it in. No paint matching is necessary to make such a replacement unless the vehicle was painted during production.

Design—Through the use of a spaceframe, including exoframe (exo-skeletal) construction, any number of design options can be utilized. For example, a particular area of the exoframe can be left exposed, partially covered by a panel or panels or completely covered by interlocking panels. The application of textured or self-colored materials on the exoframe can be used in conjunction with textured or self-colored panels, which eliminates the high-cost of paint-matching processes required for most vehicles on the road today. However, there are no restrictions on painting the vehicle, if so desired.

Structure—The inventive vehicle combines the advantages of an easily-repairable spaceframe with the benefits in stiffness realized by monocoque or unibody construction. Alterations on the spaceframe can be made not only for repairs but also to quickly transform one type of vehicle into another type of vehicle. For example, substitutions of alternative frame sections can be made on the spaceframe so that a short wheel-based two-door vehicle can be transformed into a long wheel-based four-door vehicle by locking new spaceframe segments and/or panels into place. There can be a consistent series of panels for each type of vehicle, one set for a sedan, another set for a sports utility vehicle and so on. These interlocking panels can be re-arranged to alter the makeup of a vehicle so that, for example, an S.U.V. can be swiftly converted into a truck by substituting some spaceframe and panel components. The utilization of replaceable frame sections and panels greatly simplifies the design and manufacturing process, as model changes can be made relatively quickly and with a minimum of tooling changes.

Manufacturing—With the commonality of the body parts between various models, manufacturers can take a very basic, straightforward approach toward the production of the spaceframe and the interlocking panels which form the body of the vehicle. Several types of vehicles can be produced using the same panels and/or frame sections in various combinations. A panel for a sedan, for example, can be used as a replacement for a similarly-shaped panel on a truck. The spaceframe locks together in a similar fashion to the panels and its segments are also interchangeable between various types of vehicles. With this simplified method of production, the manufacturing of the components of the unibody/chassisframe can be done by a supplier, preferably in a modular fashion. Suppliers, for example, can provide the main spaceframe and panels to the Original Equipment Manufacturers for assembly as opposed to the OEM constructing the unibody/chassisframe from large stampings produced and welded together within their own factories.

Materials—A wide range of construction materials can be used as required. The spaceframe and panels can be variously constructed of steel, aluminum, carbon fiber or thermo-plastics. In almost any combination, the materials used can produce a lighter vehicle, which not only translates into improved handling but also greater fuel efficiency.

Recyclability—The inventive vehicles have major ecological benefits because of the recyclability of parts. With most modern vehicles, finding replacement body or chassisframe parts can be difficult and costly. Sometimes, vehicle owners can wait weeks for a particular part to be shipped and then it usually has to be welded into place, finished and painted. With the modular vehicles of the present invention, there will be no need to throw away parts and leave them to rot in a junkyard or landfill. If the construction materials are carefully chosen, all the parts in the spaceframe and body can be melted down and re-used. For example, the tubes of one spaceframe can be recycled and re-used as a replacement portion of the spaceframe for another vehicle. The recycling process itself is also simplified because the inventive vehicle is comprised of various segments rather than being a single unit which requires a large crushing mechanism to assist its disposal.

While most recent auto industry inventions have been concerned mainly with cosmetic changes, the present invention embraces a vehicle-build process which breaks away from the basic approaches that the automotive industry has steadfastly relied upon for many years. It utilizes three separate locking mechanisms to create a stronger, stiffer, lighter vehicle. The inventive vehicle is thus much more efficient in many respects than vehicles of comparable size. Furthermore, the inventive vehicle presents the unique feature of allowing consumers to transform their vehicle into an alternative one while also simplifying the process of repairing damaged parts.

BRIEF DESCRIPTION OF THE DRAWINGS

The invention is illustrated in the drawings in which:

FIG. 1 is an isometric view of an auto having a chassis and body constructed according to the frame/node and interlocking panel principles of the invention with all but two of the body panels removed;

FIG. 2A is an interior isometric projection detail, with two areas, FIGS. 2B and 2C enlarged to the upper and lower right showing details of the key and lock system for mounting the body panels to the frame;

FIGS. 3A and 3B are a related pair of side elevation views showing the operation of the panel lock;

FIG. 4 is an isometric detail of the node and frame component method of interlocking with locking latches;

FIGS. 5 and 6 are a related pair of drawings showing a node/frame member latch involving an over-center latch which can be secured in place with a standard fastener, in which FIG. 5 is an isometric view, FIG. 6 shows a side section view of the two members latched together, with the two members unlatched being shown in phantom;

FIGS. 7–9 also show the modularity of the chassis and body panel systems of the invention in which: FIG. 7 shows a sedan; FIG. 8 shows the body panels for a minivan; FIG. 9 shows the body for a small pick-up.

DETAILED DESCRIPTION OF THE PREFERRED EMBODIMENTS

Figure 7:
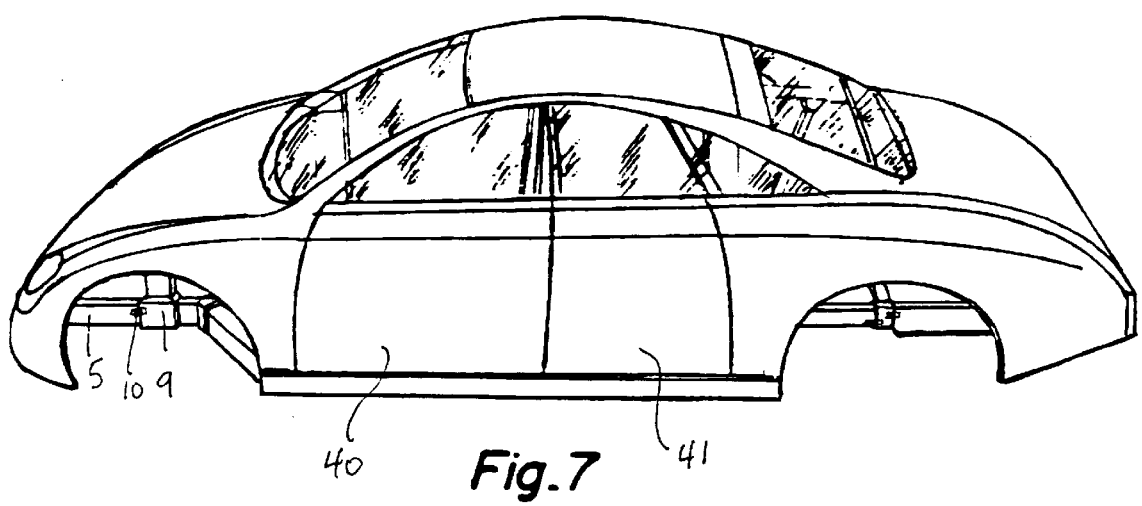
FIG. 7 illustrates in isometric projection, the connection of body panels as fully assembled to the node and spaceframe chassis of a 4-door personal auto.

Referring to FIGS. 1 and 7, a vehicle constructed according to the present invention is shown configured in the form of a sedan. FIG. 7 shows a view of the sedan with only the space frame and the body panels attached to it. FIG. 1 shows the underlying space frame of the FIG. 7 sedan comprising a plurality of frame sections 5 joined via nodes 9, with all but two body panels 7 (rear quarter) and roof 77, which is shown in both assembled, locked-in-place position and as removed. The frame sections 5 can be extrusions, stampings, tubing, channel, hydroformed elements, built up or cut-down tapered sections and the like. The nodes can be cast elements or welded stampings, or other conventional methods of making these joins or union members.

Figure 8:
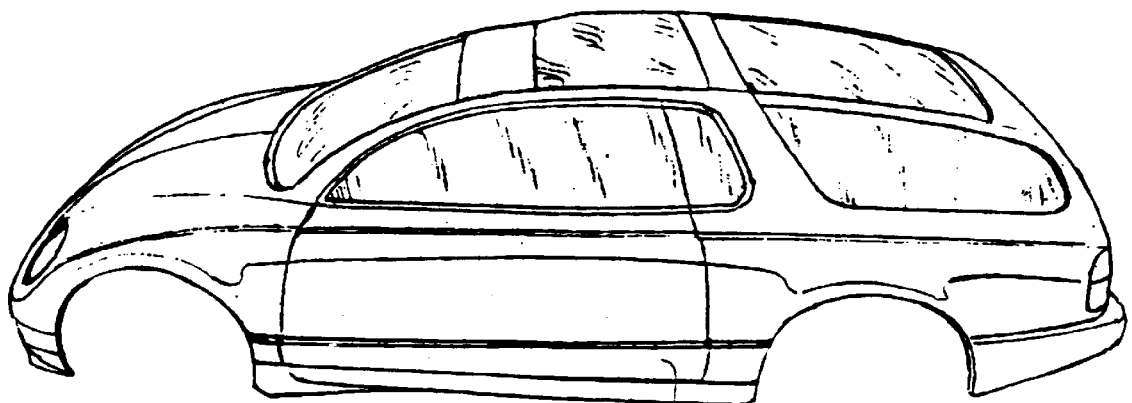
Figure 9:
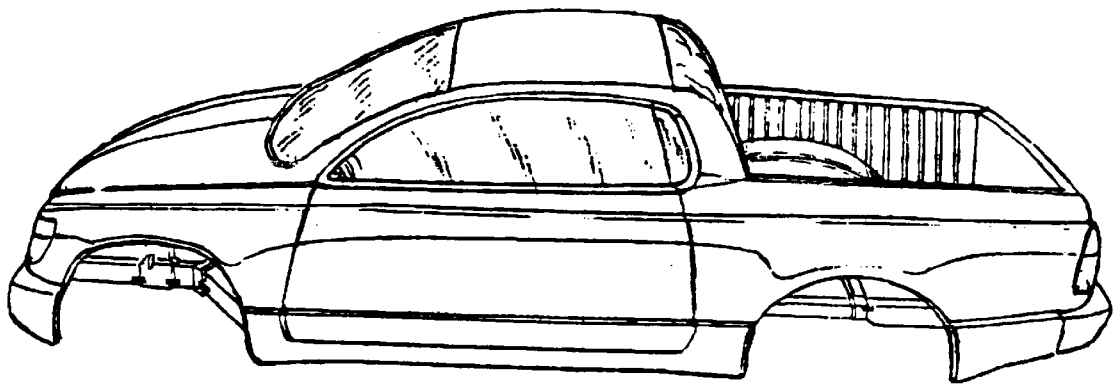

The embodiments shown in FIGS. 1, 8 and 9 are configured as a two to six seat, two-door vehicle, having vertically sliding doors, as fully described in the patents and patent applications listed above. Alternatively, conventional vertical-hinge doors or any other type of door can be used, preferably integrated structurally with the vehicle frame when closed. The embodiment of FIG. 7 is a standard four-door version with doors 40 and 41 being hung from the respective A and B pillars (FIG. 1). However, a single door on each side can extend across both the front and rear seat door openings, and is located outside of the B-pillar when closed. When open, the vertically sliding doors retract within pockets 75 under the vehicle floor. If hung from the A pillar they open in the conventional manner.

Referring to FIG. 2A–2C and 3A, 3B, the preferred method of attaching the panels to the space frame is shown. In order for the body panels to lock to the spaceframe, a typical panel 7 has at least one key 6 on each of its four sides exactly opposite corresponding receptacles 8 on the spaceframe members. A locking device 2 causes all the keys 6 to fit snugly and securely into their respective receptacles 8. This locking device 2 has an "over center" cam lever 1 and is located on the interior face of the panel 7 to engage a retractable key 3 which is moveable in a close-fitting guide 4 to engage a receptacle 8 in a selected frame component 5. This retractable key acts as a latch for the other keys, which are stationary. When the locking lever is turned, the locking mechanism causes all the keys to fit into their respective receptacles. All of the stationary keys are pointed generally in the same direction while the "latch" key is pointed in the opposite direction, i.e. oriented approximately 180 degrees from the stationary keys. The cam lever is turned approximately 90 degrees, pushing the retractable key 3 into its receptacle 8 and, via the principle of opposing force, simultaneously locking the stationary keys into their receptacles. Each of the panels preferably has at least three and as many as five to ten keys, including the "latch" key. Note that an optional hole 50 in the guide 4 and a corresponding bore 51 in key 3 which align in the latched position so that a securing bolt or pin 60 can be inserted. this is to prevent the keys from releasing in the event of a bowing-in of the panel 7 , e.g., in the case of an accident. the holes are preferably threaded. Note keeper 55 assists in alignment of key 3 in guide 8 and reduces rattling.

The locking device 2 can be stamped, molded or cast onto the panel. To ensure that the panel will firmly clasp to the spaceframe, additional force can be applied to the locking device by a lever-like hand tool, which can attach to the lever 1. The temporary extra length furnished by this tool promotes considerably more leverage to the lever and therefore, more force can easily be applied. When a panel needs to be replaced, it can be removed simply by removing the bolt, pin or screw 60 and twisting the lever 1 in the opposite direction.

While this method of affixing panels to the spaceframe is a large departure from traditional welding methods, it results in at least as stiff a structure as traditional methods.

Employing these locking devices can eliminate the need to use a hardenable resin to form receptacles in alignment with the keys. However, resin can be used in oversized receptacles to allow for manufacturing tolerances. If keys and receptacles are machine-fit (or molded) onto panels, it is ordinarily not necessary to allow for manufacturing tolerances since the locking mechanism will ensure the keys will be securely seated into their respective receptacles. The use of keys and receptacles ensures clean load paths and high resonance levels.

FIGS. 3A and 3B show schematic side section views of the preferred panel locking mechanism in the unlatched and latched positions, respectively. The locking mechanism comprises a locking lever 1, a driver member 2, a retractable key 3, guide sleeve 4, and receptacle 8. Locking lever 1 includes a cam portion 1a, typically circular, formed thereon which protrudes from lever 1 towards panel 7. Locking lever 1 with cam portion 1a are pivotably mounted to panel 7 by pivot pin 1b. Driver member 2 has a bore 2a therethrough which slidably fits around cam portion 1a of locking lever 1. Driver member 2 is mounted to panel 7 by pin 2a through slot 2c in member 2, thereby allowing member 2 to slide and pivot with respect to panel 7. Driver member 2 slidably contacts retractable key 3, which is slidably retained on panel 7 by guide 4. Key 3 is slidably engageable with mating receptacle 8 in chassis frame component 5.

FIG. 3A shows retractable key 3 disengaged from receptacle 8, and lever 1 in an upright position. To engage key 3 with receptacle 8 (as shown in FIG. 3B) when attaching panel 7 to frame 5, lever 1 is turned (preferably with a temporary lever attached, not shown) somewhat more than onequarter turn clockwise, as shown by Arrow A. In doing so, cam portion 1a of lever 1 forces driver member 2 down against key 3, Arrow B, locking it into receptacle 8 by the "over center" cam action of the locking device. To remove panel 7, lever 1 is similarly turned counter-clockwise, allowing key 3 to be disengaged from receptacle 8. Note the two holes 50 and 51 become aligned in FIG. 6 to receive the locking pin, bolt or screw 60 (see FIG. 2B).

A somewhat similar locking mechanism can be used to hold the spaceframe members together. The spaceframe components, which are manufactured by molding, stamping, casting or extruding, can be made of steel, plastic or aluminum. The frame members for the spaceframe will connect to joining pieces called nodes, which can be molded, stamped or cast, usually out of the same materials as the frame members. The nodes act as a receptacle for one or more of the key-shaped tapered ends 59 of each frame component 5. Thus, if removable panels are also to be used, the frame components will contain both keys and receptacles: keys 59 at each end of the frame member which are locked into the spaceframe node receptacles 58, and receptacles 8 in various locations for their adjoining panels.

Figure 5:
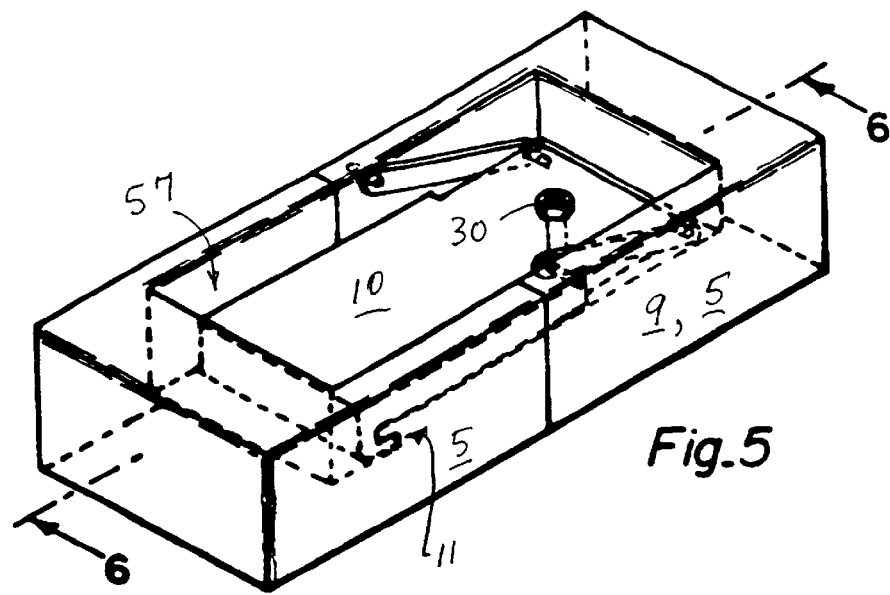
Figure 6:
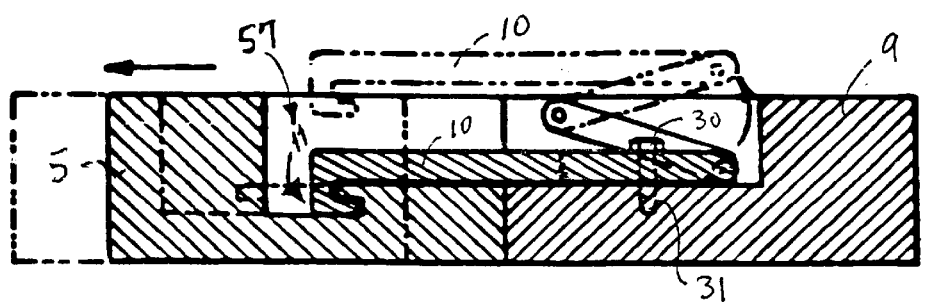

Viewing FIGS. 4–6, each node typically holds or joins to more than one frame component. The locking mechanisms for the spaceframe in the preferred embodiment are "over center" latches 10 attached to each node. The frame members are manufactured with at least one indentation or recess 57 and a groove or lip 11 near each end which will interact with the over center latch 10 on the corresponding node. The latch extends from the node and grasps onto the groove or lip 11 on the frame member, or vice versa. When attached to or fully detached from the frame members, these latches can be tucked into recesses 57 on the nodes so that the node pieces have a generally smooth surface. Each node preferably has another latch on its opposite side contacting with an additional groove on the opposite side of the frame component. Each frame component is therefore latched onto the node in two places, opposite one another.

In order to ensure a tight fit, a special tool can be used to apply additional force to the locking mechanism so that it firmly grasps onto the groove. If desired, it is conceivable that the latches can be located on and therefore attached to the frame components rather than the nodes.

As with DACIT, manufacturing tolerances may require the use of an epoxy inside the node receptacles 58 to ensure a secure fit with the ends 59 of the frame components 5. Under those conditions, the spaceframe members would be aligned and assembled in a jig. However, accurate fittings can be produced without the use of an epoxy or jig.

FIG. 4 shows a close-up view of a node connecting to three spaceframe members. The frame members 5 have key-shaped ends 59 which fit into receptacles 58 on the node 9. The frame members are also shown with a recess 57 on top with a groove 11 to accommodate the over center latch 10 on the node. The latch slides up, over and then onto the groove to secure the node to the frame component. Note that additional (optional) fastening elements (bolt 80, weld 81, rivet 82, etc.) can be used to make the join more rugged or permanent.

This locking action can be more clearly seen in the perspective view of FIG. 5 and side views of FIG. 6. In FIGS. 5 and 6, the over center latch/lever 10 is situated in a depression 57 in the node 9 and releasably secures it to adjoining frame member 5 by engaging groove 11 on frame member 5. In FIG. 6, the latch is shown in phantom after it has been released (with a pry lever tool, not shown), and node 9 and frame member 5 have been separated. Note bolt, screw or pin 30 fits in hole 31 to keep the latch 10 secured.

In order to transform one vehicle into another, some panels and frame components are removed and new spaceframe segments and panels are locked into place. The interlocking panels and spaceframe members can be reconfigured so that, for example, a sedan can be converted into a minivan or truck, as described below. This modularity feature is a key aspect of the invention. The "transformability" feature is realized by reconfiguring the vehicle with selected panels and spaceframe components. Thus, some panels and frame components are removed and new panels and spaceframe segments are locked into place via the inventive modular chassis system which locks the spaceframe components together, and the inventive modular panel system which locks the panels to the spaceframe.

FIG. 7 shows this "vehicle transportation system" in the form of a fully-assembled four-door sedan. Except perhaps for the shape of the front of the car, the vehicle shown in FIG. 7 looks much like a typical, mid-sized sedan with the wheels removed. FIGS. 1, 2 and 7 provide a clear view of the shape of the panels and how they interlock with the spaceframe. In FIG. 1, only two panels are displayed at the top and rear of the spaceframe. FIGS. 1 and 2A–2C show the keys at each end of the panels interacting with corresponding spaceframe components. FIG. 4 shows three spaceframe components and their corresponding node along with the locking mechanisms extending from each node to the adjacent frame components.

Figure 10:
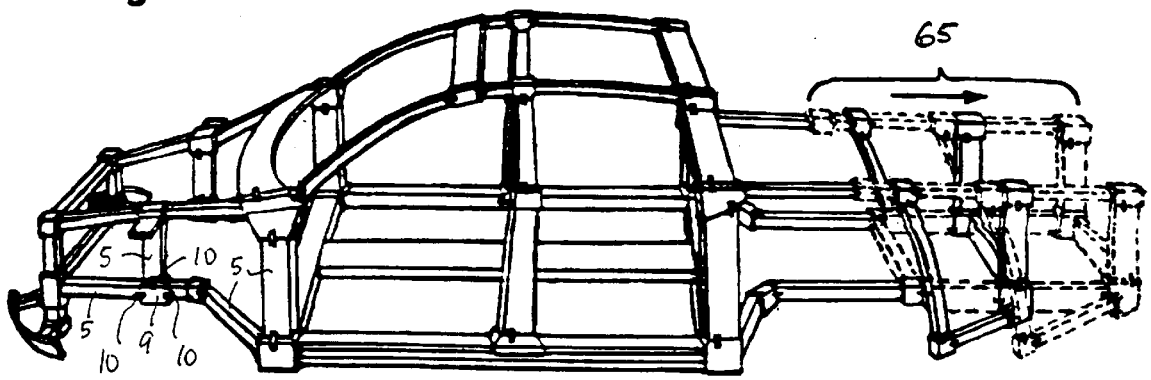
FIG. 10 shows the pick-up node and frame elements with the rear being different and the front (from cab forward) being the same or similar to FIG. 9, the short bed in solid and longer bed frame members shown in phantom.

FIG. 8 shows how this "transportation system" can look as a small mini-van. The exterior of the vehicle (minus the wheels) is shown in FIG. 8, while FIG. 10 shows the spaceframe components and nodes of the forward section. Comparing FIGS. 7, 8 and 10, it can be seen that the spaceframe components at the front of the vehicle and several components in the mid-portion stay the same. Most of the spaceframe components in the rear portion of the vehicle have been removed and/or replaced to transform the vehicle into a mini-van.

Similarly, by removing spaceframe components and making suitable replacements, the vehicle can be converted into a truck. FIG. 9 shows the panels locked to the spaceframe components to form a truck configuration, while FIG. 10 shows the configuration of the spaceframe for the truck. Once again, some of the spaceframe segments 65 toward the rear of the vehicle have been removed and/or replaced to form the shape of a truck. Naturally, a sedan can be converted into a truck, a truck into a mini-van, etc.

Referring to the phantom portion of FIG. 10, a lengthened truck is shown. By replacing some of the frame members 65 shown in solid lines in FIG. 10 (and the corresponding body panels), the truck bed and wheel base can be easily lengthened.

Industrial Applicability

These modularity and transformability features represent a breakthrough in automobile construction. In just hours, a consumer can have a sedan converted into a truck by the simple removal and replacement of appropriate spaceframe components and panels. No matter what type of vehicle is being constructed, the same platform can be used for assembly, and the nodes/frame member and lockable panel features permit field assembly, modular transformation and repair.

The nodes and frame members can be scaled or ruggedized for off-road or utility vehicle uses, for example by heavier members, or by securing the nodes to the frame members by welding, bolts, etc., or by selective use of bridging plates that can be screwed, welded or riveted to the nodes and frame members in key places in the chassis, e.g., motor mounts or suspension points.

I claim:

1. A vehicle frame assembly comprising:
   a) a plurality of spaced nodes, each having at least one receptacle;
   b) a plurality of generally elongated frame members spanning between nodes, and received at an end in a node receptacle;
   c) a latching member disposed to span between a node and a frame member to lockingly engage said frame end into said node receptacle;
   d) said nodes and frame members being selected, sized and adapted to form a vehicle space frame.

2. A vehicle frame assembly as in claim 1 wherein said frame ends comprise tapered keys and said node receptacles matingly engage said keys for secure fit.

3. A vehicle frame assembly as in claim 2 wherein said latching member includes an over-center tongue and groove latch.

4. A vehicle frame assembly as in claim 3 wherein said latching member includes a locking element to prevent said latch from popping open under use conditions.

5. A vehicle frame assembly as in claim 1 wherein said space frame forms an engine- or human-powered vehicle.

6. A vehicle frame assembly as in claim 5 wherein said interlockable node and frame members are designed and adapted to be field assemblable by hand, transformable into a variety of different vehicles, modular, and field reparable.

7. A vehicle body panel assembly comprising
   a) a configured body panel having an exterior face and an interior face;
   b) a plurality of fixed keys adjacent selected margins of said panel located on at least one interior face said panel to matingly engage correspondingly located receptacles on at least one vehicle frame member;
   c) at least one reciprocable key assembly disposed on said interior face to force said fixed keys into seated engagement with their corresponding receptacles to secure said panel to said frame.

8. A vehicle body panel assembly as in claim wherein said reciprocable key assembly includes a locking member to prevent said reciprocable key from becoming disengage from its receptacle.

9. A vehicle body assembly as in claim 8 wherein said locking member includes a lever-actuated camming element.

10. A vehicle body assembly as in claim 7 wherein said panels are configured to provide a variety of design shapes and include from 2 to about 10 keys.

11. A vehicle frame and body assembly which includes a frame assembly comprising:
    a) a plurality of spaced nodes, each having at least one receptacle;
    b) a plurality of generally elongated frame members spanning between nodes, and received at an end in a node receptacle;
    c) a latching member disposed to span between a node and a frame member to lockingly engage said frame end into said node receptacle;
    d) said nodes and frame members being selected, sized and adapted to form a vehicle space frame; and
   which frame assembly receives and carries panels comprising:
    e) a configured body panel having an exterior face and an interior face;
    f) a plurality of fixed keys adjacent selected margins of said panel located on at least one interior face said panel to matingly engage correspondingly located receptacles on at least one said frame member; and
    g) at least one reciprocable key assembly disposed on said interior face to force said fixed keys into seated engagement with their corresponding receptacles to secure said panel to said frame.

12. A vehicle frame assembly as in claim 1 wherein said nodes and frame members are ruggedized.

13. A vehicle frame assembly as in claim 1 wherein selected ones of said node and frame interconnections are substantially permanent, being secured by welding, fasteners, bridge plates and the like, such selected permanent frame interconnections being selected from chassis suspension points, motor mounts, and the like.

14. Method of constructing a vehicle comprising:
    a) providing pre-selected vehicle frame assembly components comprising:
       i) a plurality of spaced nodes, each having at least one receptacle;
       ii) a plurality of generally elongated frame members spanning between nodes, and received at an end in a node receptacle;
       iii) a latching member disposed to span between a node and a frame member to lockingly engage said frame end into said node receptacle;
       iv) said nodes and frame members being selected, sized and adapted to form a vehicle space frame; and
       v) said components being selected to form a predetermined type of vehicle;
    b) providing pre-selected matching body panel components comprising:
       i) a configured body panel having an exterior face and an interior face;
       ii) a plurality of fixed keys adjacent selected margins of said panel located on at least one interior face said panel to matingly engage correspondingly located receptacles on at least one said frame member;

iii) at least one reciprocable key assembly disposed on said interior face to force said fixed keys into seated engagement with their corresponding receptacles to secure said panel to said frame; and c) assembling said frame and body panels to form a predetermined vehicle type, such as, but not limited to, automotive sedan, coupe, van, minivan, truck, pick-up, long bed pick-up, camper, sports-utility vehicle, human powered vehicle, boat, aircraft, public transport vehicle and the like.

* * * * *